(12) United States Patent
Kellogg et al.

(10) Patent No.: US 7,228,820 B1
(45) Date of Patent: Jun. 12, 2007

(54) EXPANDABLE ANIMAL KENNEL

(75) Inventors: Michael S Kellogg, Oconomowoc, WI (US); Adam M Kellogg, Oconomowoc, WI (US)

(73) Assignee: Sportpet Designs, Inc., Waukesha, WI (US)

( * ) Notice: Subject to any disclaimer, the term of this patent is extended or adjusted under 35 U.S.C. 154(b) by 0 days.

(21) Appl. No.: 11/349,039

(22) Filed: Feb. 7, 2006

(51) Int. Cl.
*A01K 1/03* (2006.01)

(52) U.S. Cl. ..................................... 119/498

(58) Field of Classification Search ............... 119/496, 119/498, 504, 474, 473, 452, 453, 461, 482, 119/491, 513
See application file for complete search history.

(56) References Cited

U.S. PATENT DOCUMENTS

| | | | | |
|---|---|---|---|---|
| 3,848,179 A | * | 11/1974 | Kayama | 323/280 |
| 4,803,951 A | * | 2/1989 | Davis | 119/497 |
| 5,054,426 A | * | 10/1991 | Panarelli et al. | 119/473 |
| 5,335,618 A | * | 8/1994 | Zarola | 119/498 |
| 5,960,744 A | * | 10/1999 | Rutman | 119/473 |
| 7,044,083 B2 | * | 5/2006 | Farmer et al. | 119/474 |

* cited by examiner

*Primary Examiner*—Thomas Price
(74) *Attorney, Agent, or Firm*—Brian G. Gilpin; Godfrey & Kahn, S.C.

(57) ABSTRACT

An adjustable kennel provides an enclosure for an animal that is lightweight, expandable and collapsible for storage and travel. The kennel has a semi-rigid frame that can be adjusted for size and an expandable, pliable cover allowing the kennel to be adjusted appropriately for the animal occupying it. When in use, the frame includes slidably expandable support members such that the kennel can accommodate different sized animals or can be adjusted to be used over a long period of time as an animal grows.

17 Claims, 5 Drawing Sheets

EXPANDABLE ANIMAL KENNEL

FIELD OF THE INVENTION

This invention is generally directed to an expandable animal kennel suitable for different sized animals and portable for easy transport and storage.

BACKGROUND OF THE INVENTION

Various methods are used to train house pets and to house and secure them during travel or otherwise. For example, dogs are frequently house trained by confining them in a small cage or kennel where they are reluctant to soil their den-like environment. Similarly, many house pets need to be confined during travel so that they do not present a safety hazard or become a nuisance to other travelers. In such instances it is particularly important to have a cage or kennel that is an appropriate size for the animal occupying it. In addition, pets, especially dogs, may grow from small puppies needing a small kennel to large animals needing much larger kennels. In such instances it would be advantageous to have a kennel that is small enough for use with a small puppy or cat, a large kennel for use with a large animal and lightweight enough to be portable and convenient for travel and transport.

While there are several examples of adjustable or expandable kennels none of them provides the versatility that would meet all of these needs. For example, U.S. Pat. No. 5,054,426 to Panarelli et al. (the '426 patent) describes an expandable enclosure for animals that includes two rigid shells that are slidably connected to a middle portion such that sliding the two rigid portions apart expands the enclosure accordingly. U.S. Pat. No. 5,335,618 to Zarola (the '618 patent) describes a collapsible animal enclosure which includes a "doghouse" portion and a "dog run" portion. The enclosure is formed of a floor portion and a semi-circular upper portion forming a rounded enclosure that can be collapsed telescopically for storage. U.S. Pat. Nos. 5,671,697 and 5,960,744, to Rutman (the '697 and 744 patents) describe an expandable cage in which a rigid inner shell is telescopically held within a larger rigid shell.

While the above patents provide expandable animal enclosures their use is limited. For example, the '426 patent provides an enclosure that is relatively heavy and cannot be collapsed or broken down for storage. The '618 patent provides an animal enclosure that, cannot easily be transported, for example, in a car, cannot be broken down for storage and is cumbersome to expand. The '697 and '744 patents provide an animal enclosure that is both rigid and heavy and cannot be collapsed or disassembled for storage.

Thus, a versatile kennel that is adjustable in size, lightweight and can be collapsed and/or disassembled is desirable. Such an enclosure is useful during transport, during the life of a growing animal and can be disassembled for compact storage.

SUMMARY OF THE INVENTION

An adjustable kennel allows a pet owner to conveniently provide an enclosure for an animal that is lightweight, expandable and collapsible for easy storage and travel. The kennel has a semi-rigid frame that can be adjusted for size and an expandable, pliable cover allowing the kennel to be adjusted appropriately for the animal occupying it. In addition the kennel is lightweight so as to be portable and can be disassembled for easy storage when not in use. When in use, the frame includes slidably expandable support members such that the kennel can accommodate different sized pets or can be used over a long period of time as a pet grows.

In one embodiment, the invention is an expandable kennel for an animal comprising an expandable frame and an expandable, pliable cover. In one preferred embodiment, the expandable frame comprises two corresponding end-pieces, each end-piece comprised of several end members, each end member having a first-end and a second-end where the first-end and second-end of the end members are connected to each other thereby forming a polygon. The expandable frame also includes two or more horizontal members. In this embodiment, each horizontal member has a first-part and a second-part with the first-part of each horizontal member slidably connected to the second-part. In addition, the first-part of each horizontal member and the second-part of the horizontal member are correspondingly connected to the first and second end-pieces such that the end-pieces are substantially parallel and together with the horizontal members define an interior space. In this embodiment, sliding the first end-piece away from the second end-piece along an insert increases the length of the horizontal member and thus, the size of the interior space.

The invention may also include an expandable, pliable cover dimensioned to fit the expandable frame. In this embodiment, the cover has two ends and sides, and the cover has a receptacle along one or more edges dimensioned and configured to accept the members of expandable frame. In this embodiment, when the cover is fit on the frame, it encloses the interior space thereby providing an expandable enclosure for an animal. In this embodiment, the cover also includes an opening which is securable from the outside by a fastening device, such as by, for example, a zipper, a toggle, a hook and loop pair or the like.

In another embodiment, the invention provides an expandable kennel for an animal comprising an expandable frame and an expandable, pliable cover. In this embodiment, the expandable frame comprises a first end-piece and a second end-piece, the first end-piece corresponding with the second end-piece. Each end-piece is comprised of several end members, each end member having a first-end and a second-end wherein the end members are connected to each other thereby forming a polygon. In this embodiment, the expandable frame also includes two or more horizontal members. Each horizontal member having a first-part, a middle-part and a second-part. The first-part and the second-part may be slidingly connected to the middle-part, by one or more inserts or may slide over each other. The first-part and the second-part of each horizontal member are correspondingly connected to the first and second end-pieces such that the end-pieces are substantially parallel with each other and together with the horizontal members define an interior space. In this embodiment, sliding the first end-piece away from the second end-piece along the one or more inserts increases the length of the horizontal member and thus, the size of the interior space.

The invention may also include an expandable, pliable cover dimensioned to fit the expandable frame. In this embodiment, the cover has two ends and sides. In some preferred embodiments, the cover has a receptacle along one or more edges dimensioned and configured to accept the members of expandable frame. In this embodiment, when the cover is fit on the frame, it encloses the interior space thereby providing an expandable enclosure for an animal. In some preferred embodiments, the cover also includes an opening which is securable by a fastening device, such as, for example, a zipper, a toggle, an engaging collar, hook and pin, hook and loop pair or the like.

These and other features and advantages of various exemplary embodiments of the expandable kennel according to this invention are described in, or are apparent from, the following detailed description of various exemplary embodiments of the article according to this invention.

BRIEF DESCRIPTION OF THE FIGURES

Various exemplary embodiments of this invention will be described in detail, with reference to the following figures, wherein:

FIG. 2 is a side-plan view of the extendable kennel shown in FIG. 1 shown in a collapsed on;

DETAILED DESCRIPTION OF THE EXEMPLARY EMBODIMENTS

The following detailed description discloses various exemplary embodiments of an expandable kennel for animals that is lightweight and can be disassembled. The kennel according to this invention can be appropriately adjusted for the size of the animal, is portable for use during travel and can be conveniently broken down for storage. Alternative embodiments consistent with the invention could be designed and manufactured by one of skill in the art.

Figure 1:
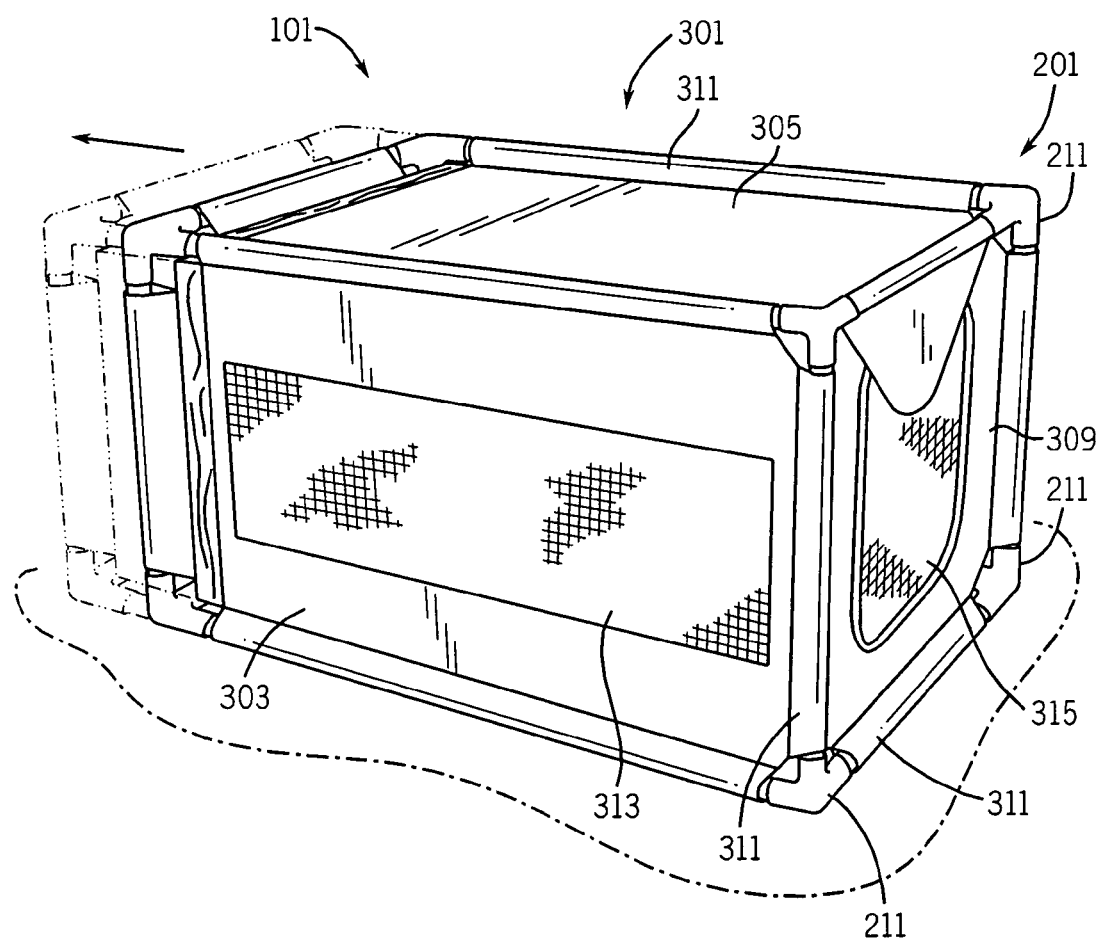
FIG. 1 is a perspective view of an extendable kennel in accordance with one embodiment of the invention.
Figure 2:
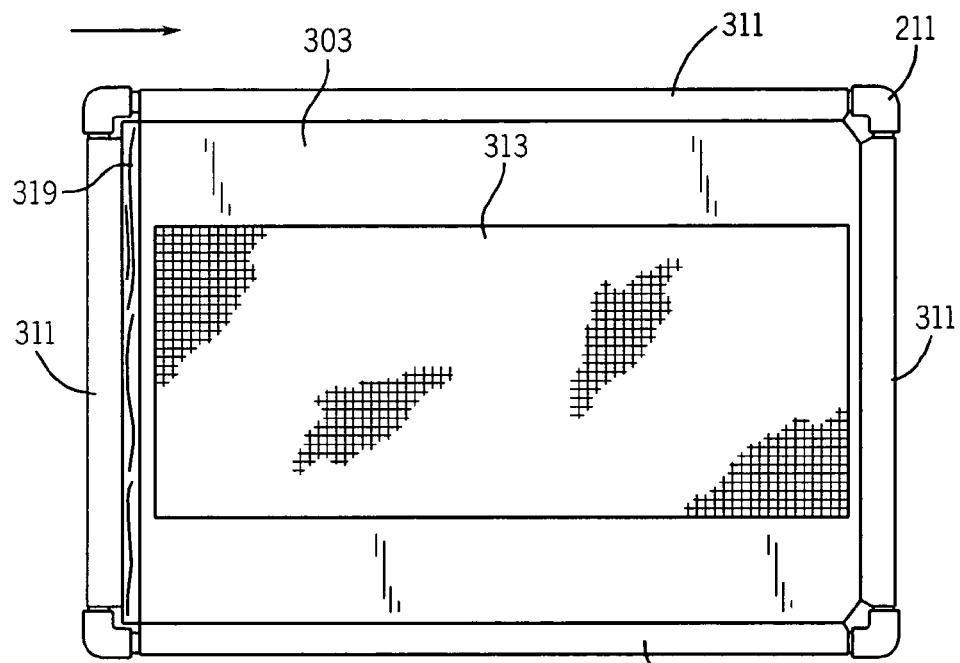
Figure 3:
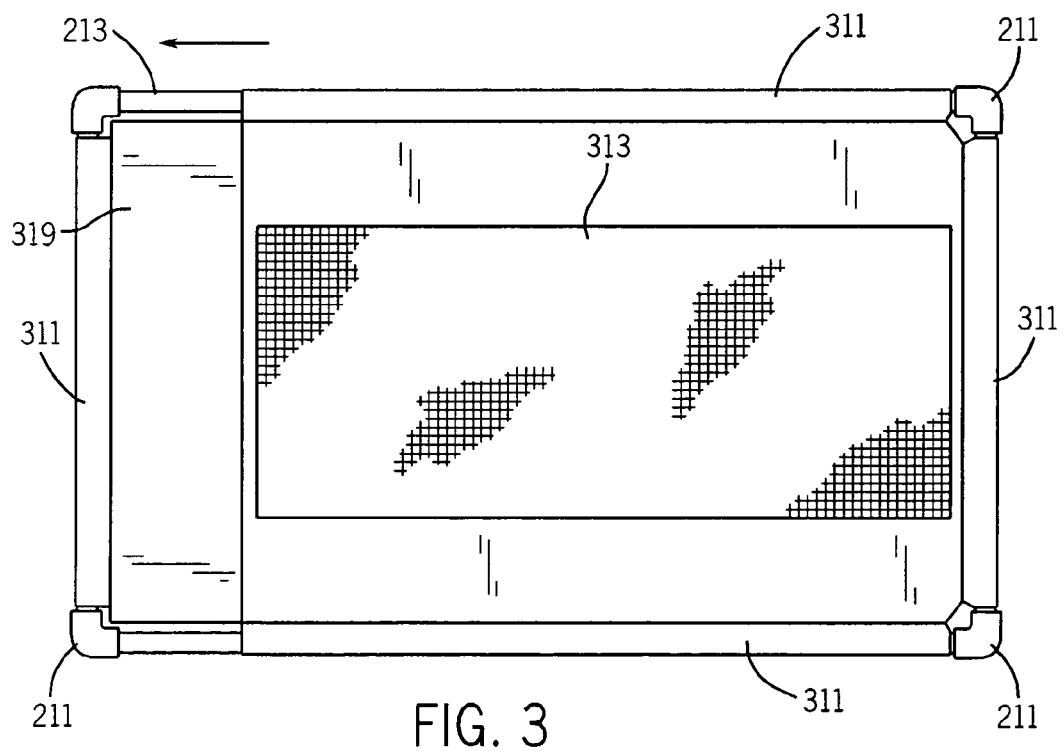
FIG. 3 is a side-plan view of the extendable kennel shown in FIG. 2, illustrating the movement of the horizontal extendable frame to an extended position.

FIG. 1 is a perspective view of one embodiment of the expandable kennel 101 according to the invention. As shown, the expandable kennel comprises an expandable frame 201 and an expandable, pliable cover 301. FIG. 2 is a side-plan view of the expandable kennel 101 while FIG. 3 is a side plan view of the same embodiment with the arrow indicating the direction of expansion of the expandable frame 201 and pliable cover 301.

Figure 4:
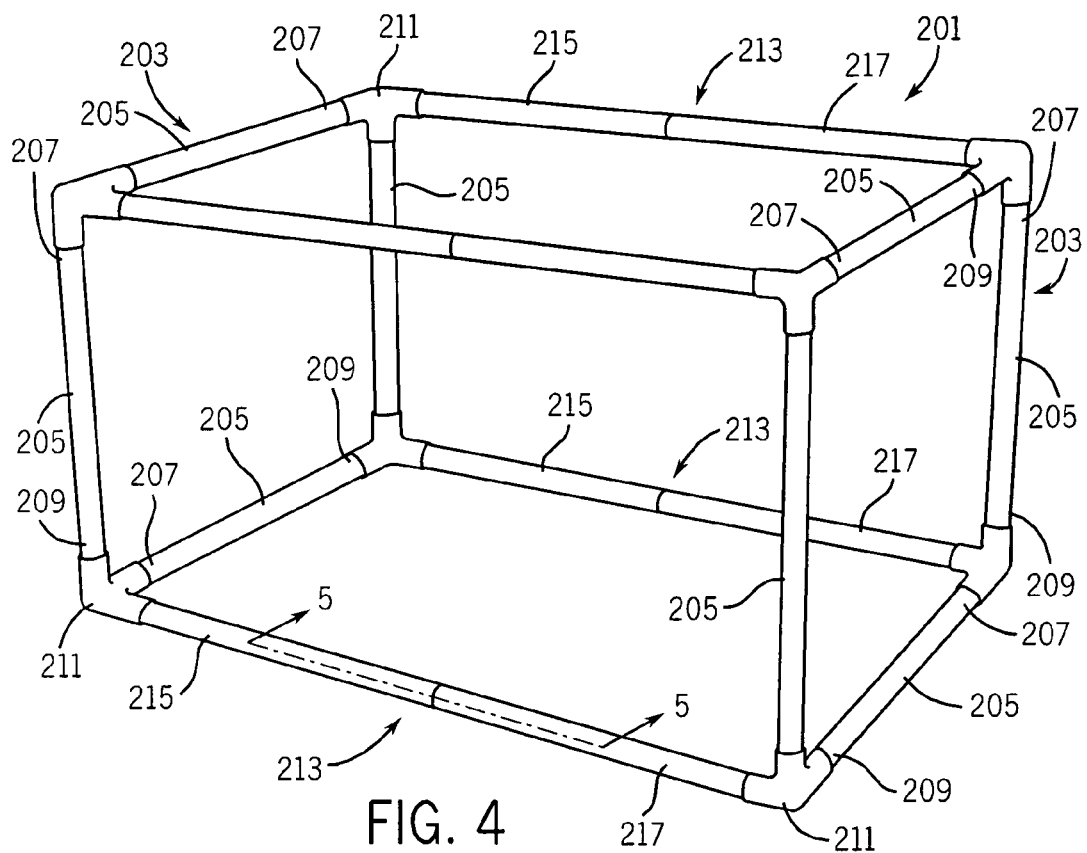
FIG. 4 is a perspective view of the extendable frame in accordance with one embodiment of the invention.

FIG. 4 illustrates one embodiment of the expandable frame 201. As shown, the expandable frame 201 includes two corresponding end-pieces 203, each end-piece comprised of three or more end members 205, each end member having a first-end 207 and a second-end 209 and wherein the ends of the end members 205 are connected by a connector 211 thereby forming a polygon, in this case a square although other shapes could be used. The expandable frame 201 also includes horizontal members 213 each having a first-part 215, and a second-part 217, wherein the first-part 215 of each horizontal member 213 is slidably connected to the second-part 217 by an insert 219.

As shown in FIG. 4, in one embodiment, the first-part of a horizontal member 215 and the second-part of the horizontal member 217 are correspondingly connected to the first end-piece 203 and second end-piece 205 by a connector 211, thereby defining an interior space. The connector 211 can be any connecting or fastening device that secures one or more end members 205 to the horizontal member 213. Such devices may include, for example, a cotter pin, lock collar or the like. As shown, in one embodiment, the connector 211 is a 3-way 90° elbow. In one embodiment, the connector 211 is designed such that the members 205, 213 are releasably held by the connector 211, such as by friction, allowing the frame to be conveniently assembled and disassembled by releasing the members 205, 213 from the connector 213. The members could be permanently secured to the connector by glue, sonic welding, or other means if desired.

Figure 5:
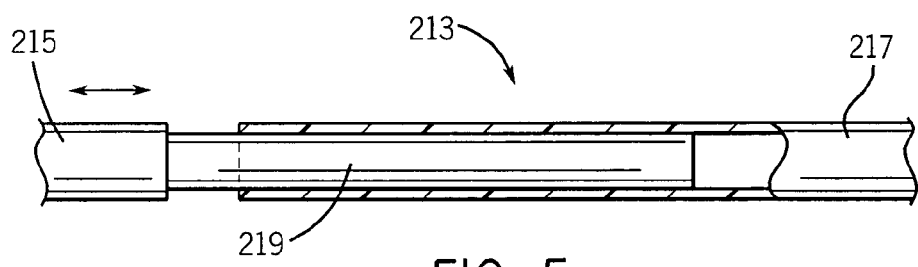
FIG. 5 is a cross-sectional view of the horizontal member shown in FIG. 4 taken generally along the line 5-5 and illustrating movement from a collapsed to an extended position.
Figure 8:
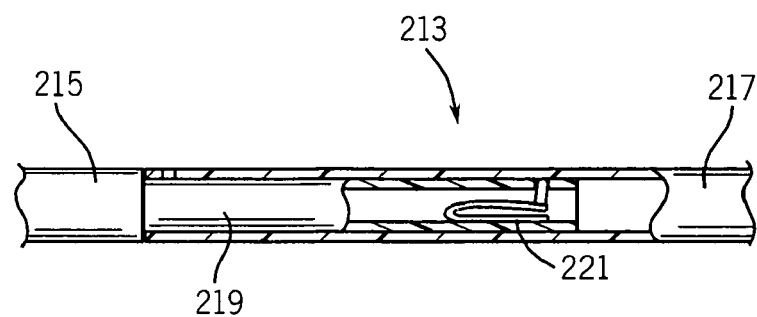
FIG. 8 is a cross-sectional view of a horizontal member in accordance with one embodiment of the invention shown in a collapsed position.
Figure 9:
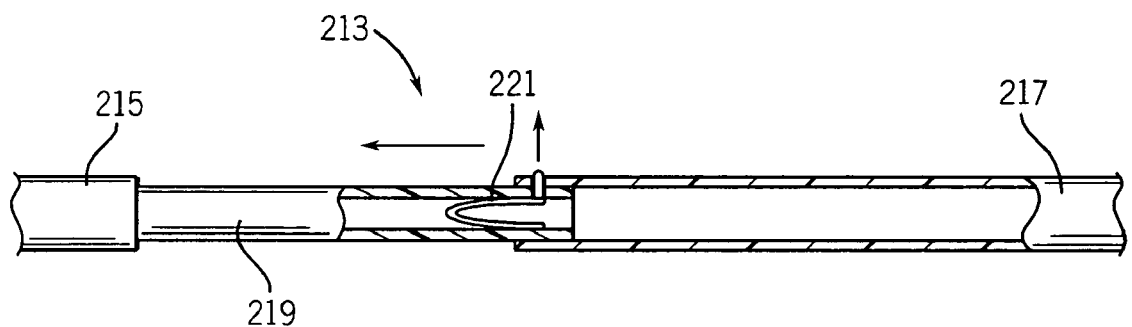
FIG. 9 is a cross-sectional view of the horizontal member shown in FIG. 8 illustrating a fastening device securing the member and the insert in an extended position.

FIG. 5 is a partial sectional view, along line 5-5 of the horizontal member 213 shown in FIG. 4. Illustrated is the insert 219 continuous with the first-part 215 and projecting into the interior of the second-part 217. The horizontal member 213 is adjusted to the desired length by sliding the second-part 217 along the insert 219 in the direction indicated by the arrow. In one embodiment, the position of the second-part 217 on the insert 219 is maintained by friction such that adjustment of the size of the expandable frame 201 is easily made by pulling the opposing end pieces 203 apart. However, in another embodiment, the insert 219 is secured to the second-part 217 by a locking device 221, as shown in FIGS. 8 and 9. In one embodiment, the locking device 221 is a snap-lock. However, it should be appreciated that any appropriate locking device is envisioned. For example, suitable locking devices may include a compression collar, cotter pin or the like.

As an alternative to the use of an insert 219, the sliding of the horizontal member 217 could be accomplished by manufacturing one of first-part 215 and the second-part 217 such that it has a slightly smaller diameter than the other part. In such an embodiment, one part would slide over the other part without the need to use an insert 219.

FIG. 1 also illustrates the expandable cover 301. As illustrated, the cover 301 is dimensioned and configured to fit the expandable frame 201. The cover comprises sides 303, including a top 305, a bottom 307, and two ends 309. In one embodiment, the cover 301 has sleeves 311 along one or more edges of the cover 301. The sleeves 311 are dimensioned to accept the frame members 205, 213 such that when the frame 201 is assembled, the members 205, 213 are passed through the sleeves 311, the members 205, 213 then secured by the connector 211 so as to construct an enclosed kennel 101. However, it should be appreciated that the cover 301 can be fixed to the frame in any appropriate way. For example, the cover may have snap pairs appropriately placed on the cover and frame, spring toggles, ties or the like appropriate for securing the cover 301 to the frame 201.

In various embodiments, the sides 303 have one or more mesh panels 313 so as to allow increased ventilation and visual inspection of the kennel 101 interior. In addition, in some embodiments, one or more ends 309 may have a mesh panel 313. In some embodiments, an end 309 may include a panel 315 that can be removed and/or opened and closed and secured, by a device such as, for example, by a zipper 317. However, it should be appreciated that the securing device can be any article useful for opening the end, such as, for example, hook and loop pairs, snaps, buttons or the like. Also illustrated in FIG. 1 is a cover insert 319. As illustrated the cover insert 319 is continuous with the cover 301 such that when the frame 201 is expanded, the cover insert 319 becomes continuous with the sides 303 of the cover 301. In some embodiments, the cover 301 is composed of a pliable material such as canvas, nylon, denim or the like. However, it should be appreciated that the cover 301 can be made of any suitable material that is pliable and collapsible such that when the frame 201 is adjusted the cover 301 also adjusts appropriately.

Figure 6:
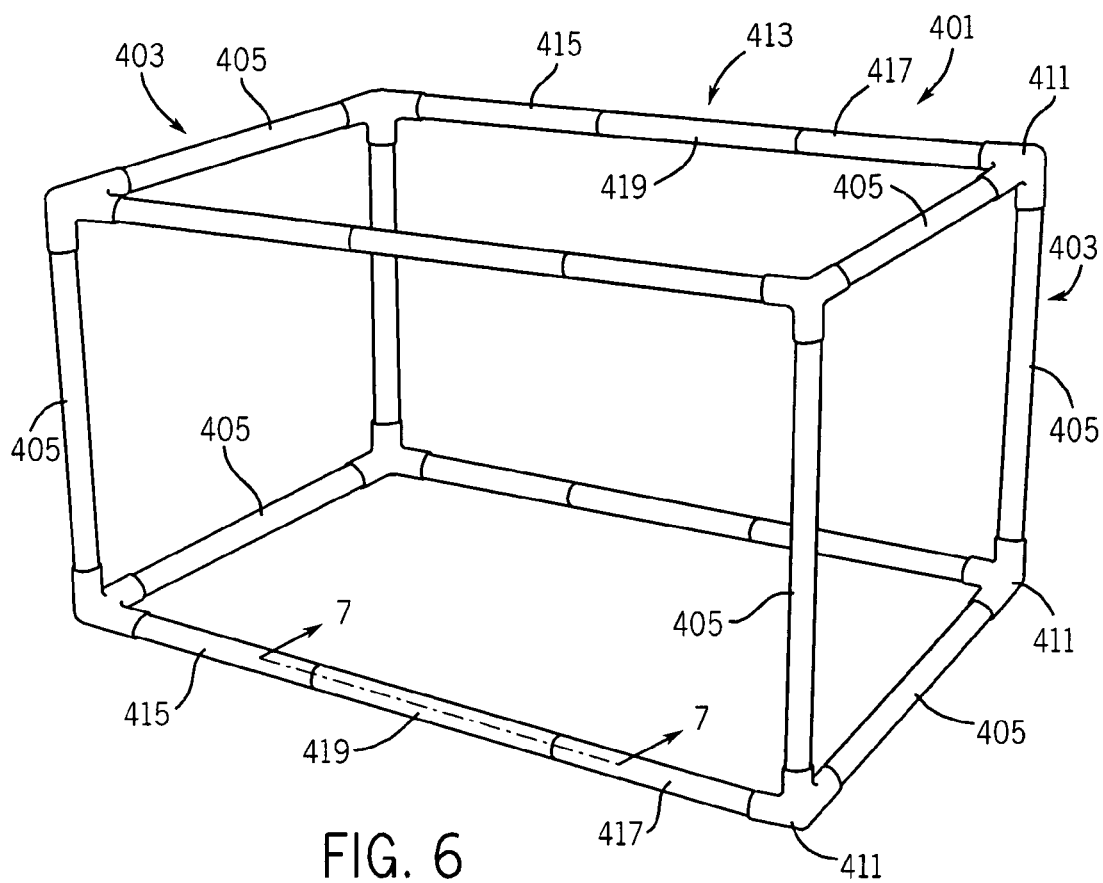
FIG. 6 is a perspective view of the extendable frame in accordance with a second embodiment of the invention.

FIG. 6 illustrates a second embodiment of the expandable frame 401 according to this invention. In this embodiment, the frame 401 has two end-pieces 403 comprised of 3 or more end members 405. The end members have first 407 and second 409 ends wherein the first and second ends are secured to each other by use of a connector 411 as described previously. In the embodiment illustrated, the connector is a 3-way 90° elbow however, any appropriate connector can be used. As shown in FIG. 6, the connector 411 has receptacles appropriate to receive the end members 405 and the horizontal members 413. In one preferred embodiment, the connector 411, the end members 405 and horizontal members 413 are appropriately sized such that the members 405, 411 are securely held in the connector 411 by friction without need for adhesives, glue or the like. However, it should be appreciated that any device capable of securing the members 405, 411 together is encompassed by the invention and adhesives or sonic welding could be used if desired. FIG. 6 also shows the horizontal members 413. As shown the horizontal member 413 have a first-part 415, a second-part 417, a middle-part 419 and one or more inserts 421.

Figure 7:
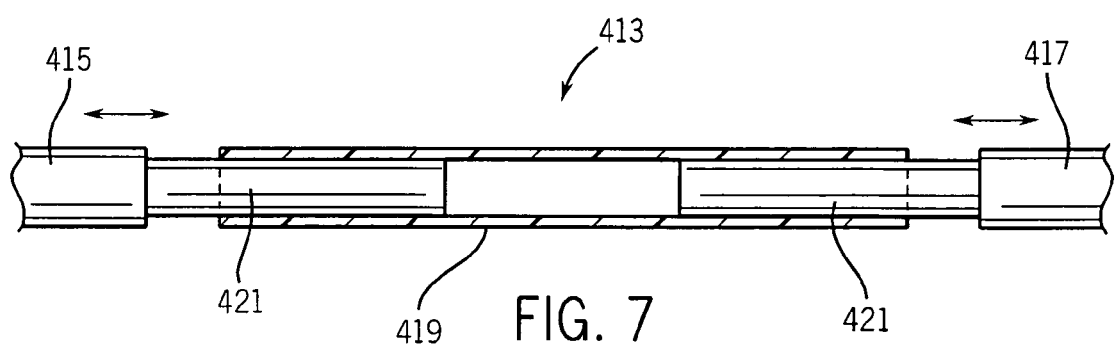
FIG. 7 is a cross-sectional view of the horizontal member shown in FIG. 6 taken generally along the line 7-7.

FIG. 7 is a partial sectional view of the horizontal member 413 shown in FIG. 6 taken along line 7-7. In the embodiment shown, the first-part 415 and the second-part 417 have inserts 421 continuous with the first-part 415 and second-part 417 dimensioned and configured to slidably fit in the interior of the middle-part 419 such that the size of the expandable frame 401 is easily adjusted by pulling on the end-pieces 403 of the kennel 101. In addition, it should be appreciated that, while FIG. 7, illustrates one embodiment in which the inserts 419 are continuous with the first-part 415 and second-part 417, in another embodiment (not shown), the inserts 419 may be continuous with the middle-part 421, such that the inserts slidably fit within the interior of the first-part 415 and second-part 417.

While the frame of the kennel can be fabricated from any suitable material, in various embodiments, the frame is fabricated out of plastic, vinyl, fiberglass, aluminum or the like. Additionally, in one embodiment, the frame is hollow, such as, for example, tubing or pipe. However, those of skill in the art will recognize that the hollow members need not be round in cross section but may be any shape, such as rectangular, for example, that allows for the members to slidably house the inserts. In some embodiments, when the frame is tubing, it may be made of a strong, semi rigid material such as, for example poly vinyl chloride (PVC) pipe. When the frame is constructed of PVC pipe or similar material, the hollow frame results in a lightweight, durable frame that is easily taken apart and stored or that is easily assembled and transported.

While this invention has been described in conjunction with the embodiments outlined above, various alternatives, modifications, variations, improvements, and/or substantial equivalents, whether known or that may be presently unforeseen, may become apparent to those having at least an ordinary skill in the art. The embodiments of the invention as set forth above are intended to be illustrative, not limiting. Various changes may be made without departing from the spirit and scope of the invention. The invention is intended to embrace all known or earlier developed alternatives, modifications, variations, improvements and/or substantial equivalents.

What is claimed is:

1. An expandable kennel for an animal comprising:
an expandable frame, including:
two correspondingly shaped end-pieces;
a plurality of horizontal members, each horizontal member having a first-part and a second-part, wherein the first-part of each horizontal member is slidably connected to the second-part, wherein the first-part of a horizontal member and the second-part of the horizontal are connected to the first and second end-pieces thereby defining an interior space; and wherein sliding the first end-piece away from the second end-piece increases the volume of the interior space; and
an expandable cover dimensioned to fit the expandable frame, wherein the expandable cover has two ends and sides, and wherein the cover has a sleeve along one or more edges dimensioned and configured to accept the horizontal members of the expandable frame, wherein the cover fits on the frame so as to enclose at least a portion of the interior space thereby providing an expandable kennel.

2. The expandable kennel of claim 1, wherein the correspondingly shaped end-pieces are shaped in a polygon and wherein connecting the horizontal members to the first end-piece and second end-piece results in an expandable frame having rectangular sides.

3. The expandable kennel of claim 1, wherein the frame is hollow and comprised of a semi-rigid material.

4. The expandable kennel of claim 1, further comprising an insert connecting the first-part of at least one of the two or more horizontal members and the second-part of the at least one of the two or more horizontal members, wherein the insert is frictionally fitted within the horizontal members.

5. The expandable kennel of claim 1, further comprising a locking mechanism provided on at least one of the plurality of horizontal members, the locking mechanism capable of selectively retaining at least one of the plurality of horizontal members in an extended position.

6. The expandable kennel of claim 1, wherein the first-part of at least one of the two or more horizontal members is slidably positioned at least partially over the second-part of the at least two or more horizontal members.

7. The expandable kennel of claim 1, wherein the second-part of at least of the two or more horizontal members is slidably positioned at least partially over the first-part of the at least two or more horizontal members.

8. The expandable kennel of claim 1, wherein one or more ends of the expandable cover has a panel that can be opened and secured, thereby forming a door for the kennel.

9. An expandable kennel for an animal comprising:
an expandable frame, including:
two correspondingly shaped end-pieces;
a plurality of horizontal members, each horizontal member having a first-part and a second-part, wherein the first-part of each horizontal member is slidably connected to the second-part, wherein the first-part of a horizontal member and the second-part of the horizontal are connected to the first and second end-pieces thereby defining an interior space; and wherein sliding the first end-piece away from the second end-piece increases the volume of the interior space; and an expandable cover dimensioned to fit the expandable frame, wherein the expandable cover has two ends and sides, and wherein the cover has a sleeve along one or more edges dimensioned and configured to accept the horizontal members of the expandable frame, wherein the cover fits on the frame so as to enclose at least a portion of the interior space thereby providing an expandable kennel, and wherein the correspondingly shaped end-pieces and the horizontal members are connected by 3-way elbow fixtures.

10. An expandable kennel for an animal comprising:
an expandable frame, including:
- a first end-piece and a second end-piece, the first end-piece corresponding in shape with the second end-piece, and comprised of a plurality of end members, each end member having a first-end and a second-end and wherein the end members are connected to each other by the first and second ends thereby forming a polygon;
- two or more horizontal members, each horizontal member having a first-part a middle-part and a second-part, wherein the first-part of each horizontal member is connected to one end-piece and the second-part is connected to the second end-piece and wherein the first and second-parts slidably connected to the middle-part; and wherein connecting the horizontal members to the end-pieces defines an interior space; and
an expandable cover dimensioned to fit the expandable frame, wherein the cover has two ends and sides, and wherein the cover has a sleeve along one or more edges dimensioned and configured to accept the members of expandable frame, wherein the cover fits on the frame so as to at least partially enclose an interior compartment thereby providing an expandable kennel.

11. The expandable kennel of claim 10, wherein the polygon is a square and wherein connecting the horizontal members to the first end-piece and the second end-piece results in a frame having rectangular sides.

12. The expandable kennel of claim 10, wherein the frame is comprised of a semi-rigid material.

13. The expandable kennel of claim 10, wherein a first insert is frictionally held within the horizontal members so as to connect the first-part and the middle-part and a second insert is frictionally held within the horizontal members so as to connect the middle-part and the second-part.

14. The expandable kennel of claim 10, further comprising a locking mechanism provided on at least one of the horizontal members, the locking mechanism capable of selectively retaining at least one of the horizontal members in an extended position.

15. The expandable kennel of claim 10, wherein the members and the fixtures are friction-fit.

16. The expandable kennel of claim 10, wherein one or more ends of the expandable cover has a panel that can be opened and secured, thereby forming a door for the kennel.

17. An expandable kennel for an animal comprising:
an expandable frame, including:
- a first end-piece and a second end-piece, the first end-piece corresponding in shape with the second end-piece, and comprised of a plurality of end members, each end member having a first-end and a second-end and wherein the end members are connected to each other by the first and second ends thereby forming a polygon;
- two or more horizontal members, each horizontal member having a first-part a middle-part and a second-part wherein the first-part of each horizontal member is connected to one end-piece and the second-part is connected to the second end-piece and wherein the first and second-parts slidably connected to the middle-part; and wherein connecting the horizontal members to the end-pieces defines and interior space; and
an expandable cover dimensioned to fit the expandable frame, wherein the cover has two ends and sides, and wherein the cover has a sleeve along one or more edges dimensioned and configured to accept the members of expandable frame, wherein the cover fits on the frame so as to at least partially enclose an interior compartment thereby providing an expandable kennel, and wherein the end-pieces and the horizontal members are connected by 3-way elbow fixtures.

* * * * *